March 16, 1965

V. C. DAVIS ETAL 3,173,288

MELTING POINT TESTER

Filed Oct. 10, 1962

INVENTORS
VINCENT C. DAVIS
RUDOLF F. KLAVER

BY
ATTORNEYS

March 16, 1965   V. C. DAVIS ETAL   3,173,288
MELTING POINT TESTER
Filed Oct. 10, 1962   2 Sheets-Sheet 2

INVENTORS
VINCENT C. DAVIS
RUDOLF F. KLAVER
BY
ATTORNEYS

United States Patent Office 3,173,288
Patented Mar. 16, 1965

3,173,288
MELTING POINT TESTER
Vincent C. Davis, Richmond, and Rudolf F. Klaver, Albany, Calif., assignors to California Research Corporation, San Francisco, Calif., a corporation of Delaware
Filed Oct. 10, 1962, Ser. No. 229,587
7 Claims. (Cl. 73—17)

This invention relates to apparatus for determining the melting point of a normally liquid material, such as a hydrocarbon distillate, and particularly refers to an improved apparatus which will controllably produce a melted portion of initially frozen material which in turn modifies a light beam that actuates a temperature indicator or recorder means.

Heretofore it has been the practice to determine the melting point of normally liquid hydrocarbons and similar distillate materials such as stove oil, furnace oil, jet fuel and the like, by visual observation of the formation of crystals while the temperature is progressively lowered by a suitable refrigerant, or by apparatus which is influenced by crystal formation to separate cyclically actuated contacts under similar temperature reductions.

This device utilizes the opposite effect, viz., a small quantity of the material is frozen under controlled conditions and is then warmed gradually, while its temperature is continuously recorded or indicated. When a portion of the material is melted sufficiently to become detached from the frozen mass, it falls by gravity through a beam of light to modify the latter, and the temperature at which this occurs is observed or recorded. This has proved to be reproducible and accurate to 1° F. whereas previous procedures and apparatus give results that vary as much as 5° F. It may also be used to determine, by suitable correction factors, what is commonly termed "pour point," which is generally defined as being about 5° F. above the melting or freezing point temperature for the liquid in question.

Among the objects of the invention are:

To provide an improved melting point tester for hydrocarbon distillates and the like, involving a manually actuated freezing probe and automatic means for indicating and recording the temperature at which the material melts from the probe tip.

To provide an improved melting point tester in which visual observation of the sample condition is obviated, to obtain reproducible results that are not influenced by human or personal factors.

To provide a melting point tester that is fast, that is inexpensive and simple to fabricate and use and that is operable by relatively unskilled personnel.

These and other objects and advantages will be further apparent from the following description of a preferred embodiment, taken in connection with the attached drawings, which form a part of this specification.

Figure 1:
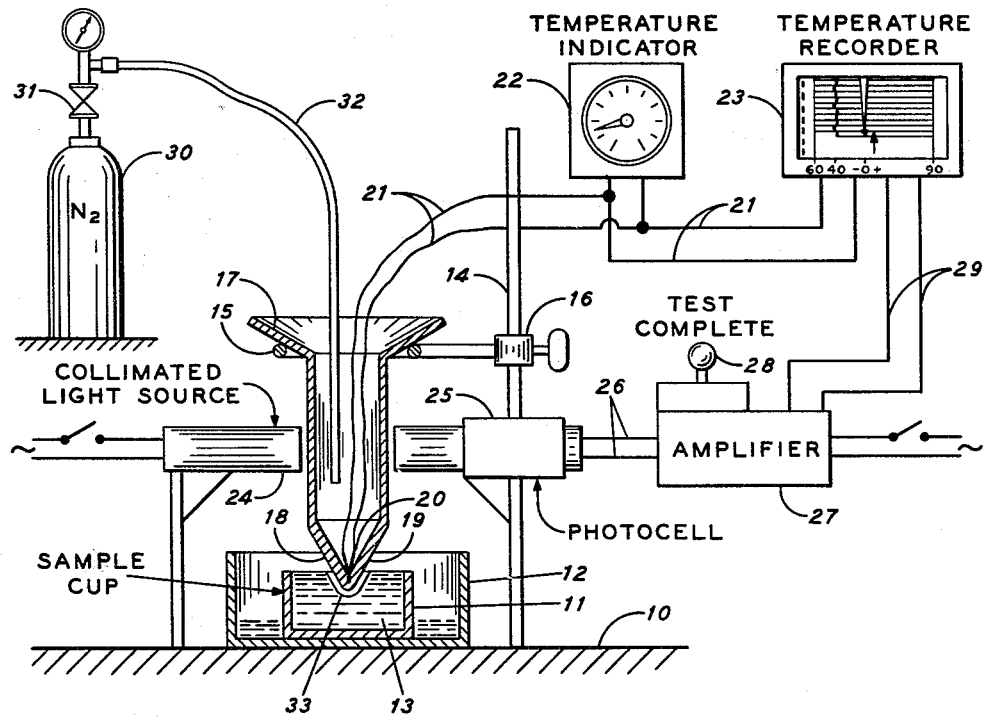
FIGURE 1 is a diagrammatic view, partially in section and partly to an enlarged scale of an embodiment for testing hydrocarbon distillates, with the freezing probe immersed in the sample.

Referring to the drawings, reference numeral 10 designates a base on which rests an open cylindrical sample cup 11 surrounded by an overflow retainer 12 and adapted to maintain a predetermined maximum level for liquid sample 13. A support rod 14 extends upwardly from base 10 and is provided with a ring 15 and clamp 16 adjustably supporting a hollow cylindrical metal freezing probe 17 so that its conical closed lower tip 18 may be immersed a predetermined constant distance into sample 13. Initially, cup 11 is filled completely, and the immersion of tip 18 displaces a small amount into the surrounding annulus, leaving the liquid flush with the upper rim of the cup.

Probe 17 is preferably provided with a relatively thick-walled lower portion 19 adjacent to and including tip 18 to accommodate a thermocouple 20 having a pair of flexible conductors 21 communicating with a temperature indicator 22. Conductors 21, if desired, may also extend to a continuously operating temperature recorder 23.

At one side of probe 17 is supported a collimated light source 24 axially aligned with a photocell 25, the latter carried by rod 14 so that a narrow light beam from 24 will intersect a vertical axis through probe 17. The output of photocell 25 is conducted by leads 26 to a suitable amplifier 27, which is connected to a beam condition indicating lamp 28, and which may also be connected by leads 29 to the pen driving motor of temperature recorder 23, as will be described below. Adjacent to probe 17 there is provided a source of refrigerant, desirably liquefied nitrogen, in this example contained in an insulated Dewar flask 30 having a suitable control valve 31. A flexible metallic tube 32 leads from the outlet of valve 31 and is adapted to be placed with its open end inside of hollow probe 17 to discharge a stream of refrigerant therein. This reduces the temperature of the tip 18 and the liquid immediately surrounding it below the expected melting point of the liquid sample 13.

Figure 2:
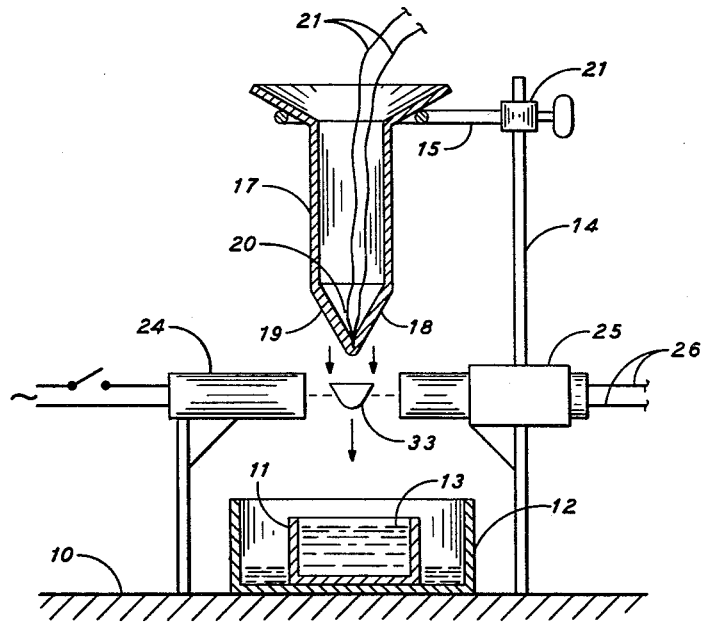
FIGURE 2 is a similar view, with the freezing probe with drawn from the sample container to allow the frozen portion to attain its melting point and actuate the temperature indicator or recorder.

After the temperature indicator 22 has shown that tip 18 has attained this desired low temperature, which should be consistent for successive samples to insure a substantially constant thickness or cap of frozen sample material 33 adhering to the point from sample 13, the flow of refrigerant from tank 30 is stopped and tubing 32 is withdrawn from the probe 17. Generally, a thickness of about $\frac{1}{16}$ inch is ample for the cap 33. Thereafter, clamp 16 is loosened and support ring 15 is raised to the position shown in FIGURE 2, so that the end of probe tip 18 and the adhering frozen cap 33 will be just above the axis of the beam of light from source 24 to photocell 25. Amplifier 27 is then energized to be responsive to any sudden change of output of photocell 25 due to interruption of the light beam from source 24.

In a short time the heat of the ambient air or, if desired, a supplemental heater (not shown) will raise the temperature of the frozen material of cap 33 and the tip 18 of probe 17 until the cap 33 starts to melt, whereupon it will usually fall as a unit into cup 11 under the influence of gravity. Certain liquids, particularly of higher viscosity, may be of such consistency when frozen that they will not become entirely detached as a cap but will form a "drop" which will fall from the cap 33 into cup 11. In either case, the collimation of the light source 24 and the output of amplifier 27 are adjusted so that the cap or drop will abruptly modify or interrupt the light beam and the amplified photocell output to cause the indicating lamp 28 to be actuated. When this occurs the temperature shown by indicator 22 is noted, and will be the melting point of the liquid sample 13. Alternatively, or additionally, the amplifier 27, through leads 29 and a suitable relay, may act to interrupt momentarily the chart pen driving motor of the continuously operating temperature recorder 23 to make a short dash or other irregularity on the chart record, as will be understood by one skilled in this art. The dash or other mark will be a record of the melting point temperature of the cap 33 of the material being tested.

Figure 3:
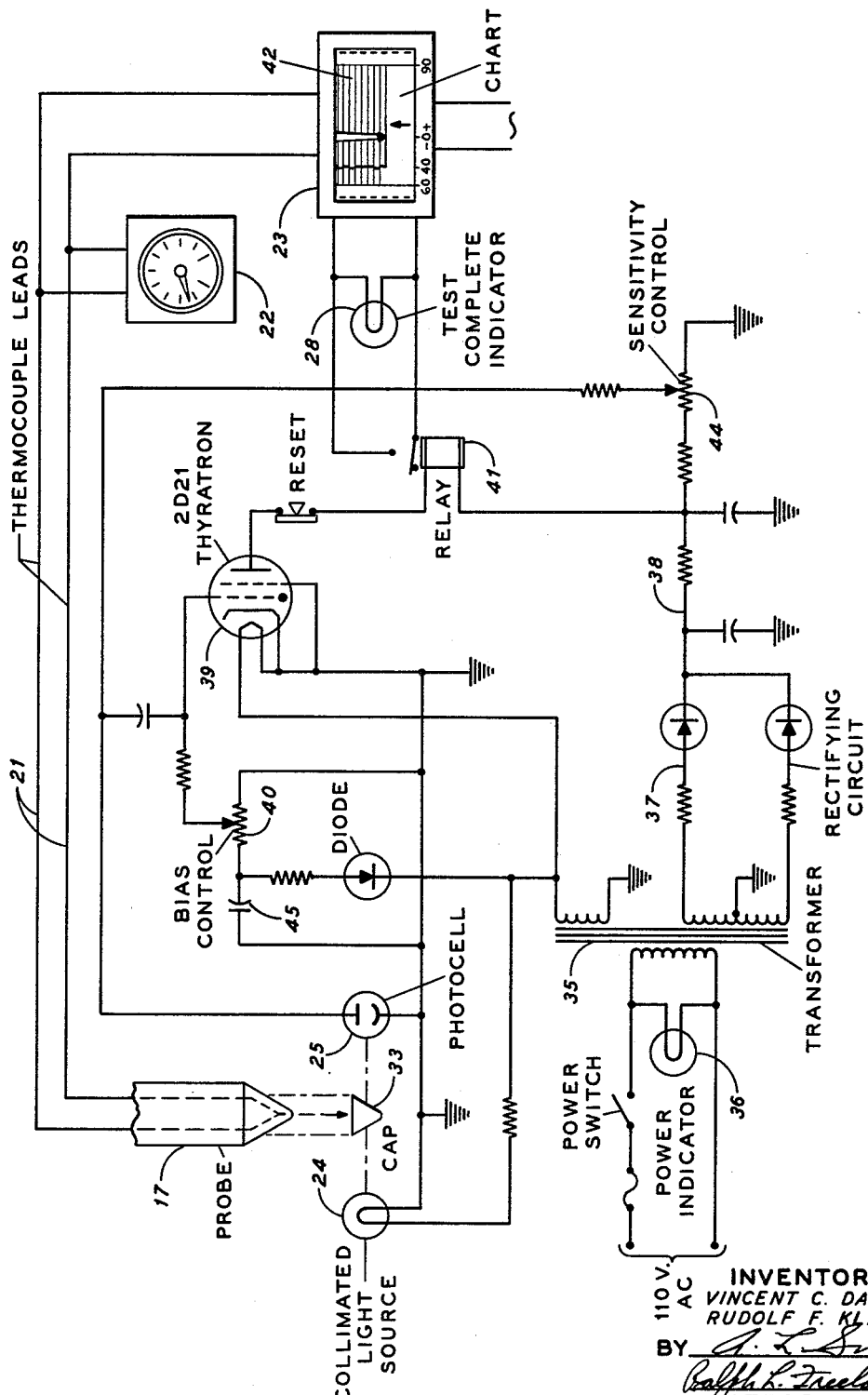
FIGURE 3 is a diagram of the electrical circuit employed in the arrangements of FIGURES 1 and 2.

Referring now to FIGURE 3, which illustrates diagrammatically the relationship of probe 17, cap 33, collimated light source 24, and photocell 25 at the instant the cap 33 interrupts the light beam, power transformer 35 is supplied from a suitable A.C. source as shown and is desirably provided with a lamp 36 to indicate that the power is on. A rectifier circuit 37 and filter 38 supplies suitable plate voltage to thyratron 39 which is biased negatively under the control of resistor 40 to continue nonconducting, until a high rate of change of light intensity reaching the photocell 25 provides a positive pulse to the control grid and fires the thyratron. This closes relay 41, stopping the pen driving motor in recorder 23 and leaving a dash on the chart 42. It also turns off indicator lamp 28 informing the operator that the test is complete. Sensitivity control is carried out by resistor 44 to adjust the response of photocell 25 to the passage of cap or drop 33 through the light beam from source 24. Capacitor 45 differentiates the output of photocell 25 and makes it sensitive to rate of change, so that it responds only to the desired beam interruption and not to condensed vapors which may be caused by the sample cooling procedure.

Although a single example of apparatus has been illustrated and described, it is obvious that numerous changes and alterations could be made without departing from the invention herein, and all such that fall within the scope of the appended claims are intended to be embraced thereby.

We claim:
1. Apparatus for determining the melting point of a normally liquid material comprising a container for the liquid to be tested, a movable probe having a tip adapted to be immersed in said liquid, means for reducing the temperature of said probe below the freezing point of said liquid to produce a cap of frozen material on the tip of said probe, means for withdrawing said probe from said liquid and raising its temperature to melt at least a portion of said cap and to cause at least a portion of the material of said cap to fall from the tip of said probe, and means actuated by the falling material for recording the temperature of said tip at the time at least a portion of said cap material falls from said tip.

2. Apparatus according to claim 1 in which said last named means comprises, in addition to said temperature recording means, a light source positioned at one side of said probe tip, means responsive to said light source and positioned at the opposite side of said probe tip and in alignment in a plane with said light source and with said probe tip to cause said material of said cap falling from said probe tip to modify the response to said light source of said last named means.

3. Apparatus according to claim 1 in which the temperature of said probe tip is continuously recorded, and means for making a distinctive marking on the temperature record at the time said material falls from said probe tip.

4. Apparatus for determining the melting point of a normally liquid hydrocarbon material, comprising a container for said material, a hollow probe having a closed lower tip supported above said container and selectively vertically movable to immerse said tip into said liquid and withdraw it above said liquid, means for introducing a refrigerant into said probe to freeze a thin cap of said liquid on said tip, means for heating said tip when it is withdrawn from said liquid to cause at least a portion of the material of said cap to fall from said tip, and means actuated by the material falling from said tip for measuring the temperature of said tip when any portion of said material of said cap falls from said tip.

5. Apparatus according to claim 4 in which said last named means comprises, in addition to said temperature measuring means, a light source positioned at one side of said probe tip, means responsive to said light source positioned at the opposite side of said probe tip and in alignment with said light source, said portion of said material falling from said probe tip being directed to pass between said light source and the light responsive means to modify the response to said light source of said light responsive means.

6. Apparatus according to claim 4 in which the temperature of said tip is continuously recorded, and means for making a distinctive marking on the temperature record at the time said material falls from said probe tip.

7. Apparatus for determining the melting point of a normally liquid hydrocarbon material, comprising a container for said material, a hollow probe having a closed lower tip supported above said container and selectively vertically movable to immerse said tip into said liquid and withdraw it above said liquid, means for introducing a refrigerant into said probe to freeze a thin cap of said liquid on said tip when said tip is immersed in said liquid, means for heating said tip when it is withdrawn from said liquid to melt at least a portion of the material of said cap, and means actuated by the melted material of said cap for measuring automatically the temperature of said tip at the time said material of said cap melts.

References Cited by the Examiner
UNITED STATES PATENTS

| 2,635,456 | 4/53 | Barstow | 73—17 |
| 2,658,383 | 11/53 | Chipley | 73—17 |
| 2,671,335 | 3/54 | Bussey | 73—17 |
| 2,872,273 | 2/59 | Stamper | 346—33 |

FOREIGN PATENTS

| 726,307 | 3/55 | Great Britain. |

RICHARD C. QUEISSER, *Primary Examiner.*